UNITED STATES PATENT OFFICE.

LEOPOLD PH. HEMMER, OF AIX-LA-CHAPELLE, GERMANY.

PLASTIC MATERIAL FOR REPLACING WOOD, METAL, STONE, &c.

SPECIFICATION forming part of Letters Patent No. 520,824, dated June 5, 1894.

Application filed July 19, 1893. Serial No. 480,945. (No specimens.)

*To all whom it may concern:*

Be it known that I, LEOPOLD PH. HEMMER, a subject of the German Emperor, and a resident of Aix-la-Chapelle, Germany, have invented certain new and useful Improvements in Plastic Material for Replacing Wood, Stone, Metal, &c., (for which I have obtained Letters Patent in no other country,) of which the following is a specification.

The present invention relates to a composition of matter, which may easily be worked and is adapted for use as a substitute for wood, metal, stone and similar materials on account of its readiness to assume various degrees of hardness and toughness.

The main ingredients of this composition are hydraulic cement and a solution of india-rubber, or gutta percha, or balata which are mixed with water or other suitable liquid. According to the use to be made of the final product one or more of the following materials can eventually be added: white lead, oxide of zinc, red oxide of lead, chalk, barytes, pulverized glass, quartz, fluor spar, sulphur. This addition of one of the last mentioned materials is intended to facilitate the mixture of cement and solution, which of itself is a rather difficult one.

I attain my objects by the following process: At first the cement is mixed with water and as soon as this operation is completed the before mentioned solution of india-rubber, or gutta percha, or balata is added and the whole intimately mixed, through which process a pasty stuff is attained which in this state can be easily worked, and which, if more water be added, can be cast in a mold, and afterward for the purpose of hardening the same is immersed in water or in a solution of water and waterglass or exposed to the humidity of the air. The proportions generally adopted are about one hundred (100) parts of cement, forty (40) parts of water and ten (10) parts of india-rubber, gutta percha, or balata solution. The proportion of the cement to the india-rubber, gutta-percha, or balata is regulated according to the purpose for which it is intended to use the final material. The more cement is employed the harder will be the composition. This relative hardness and toughness of the described composition of matter and its facility for shaping combined with durability renders it especially useful in connection with machine, building construction and for sculptors, masons and others.

This composition can be used for casting or stamping and pressing, and after being dried remains more or less in a plastic condition, if preserved from humidity, till it is immersed in water, or in a solution of water and water-glass, or it need only be exposed to the humidity of the air to give it the required hardness.

This material beyond the cases already mentioned and innumerable other cases, is especially serviceable for the preparation of rollers, for use in machines by which textile fabrics are treated with water or other liquids.

The wooden or metallic rollers hitherto in use have both a great disadvantage inasmuch as the first-named rollers soon lose their cylindrical form through the influence of the water, while the latter become more or less oxidized and produce spots on the fabrics. Rollers manufactured from the above described material neither lose their cylindrical form nor cause spots on the fabrics, as they are not affected by the souring process, soda-lyes, &c., as used in the textile industry.

Having thus fully described my invention, what I claim, and desire to secure by Letters Patent, is—

A composition of matter acquiring hardness in water and through the humidity of the air, not splitting through drying and exposure to heat, consisting of hydraulic cement, water, a solution of indiarubber, gutta-percha or balata and red oxide of lead, substantially as and for the purpose set forth.

In testimony that I claim the foregoing as my invention I have signed my name in presence of two subscribing witnesses.

L. PH. HEMMER.

Witnesses:
JOHN HECKMANNS,
JOHNSON BRIGHAM.